(12) United States Patent
Ma

(10) Patent No.: US 11,552,511 B2
(45) Date of Patent: Jan. 10, 2023

(54) STATOR ASSEMBLY, ELECTRICAL MOTOR, WIND POWER GENERATOR SET AND METHOD FOR COOLING STATOR ASSEMBLY

(71) Applicant: BEIJING GOLDWIND SCIENCE & CREATION WINDPOWER EQUIPMENT CO., LTD., Beijing (CN)

(72) Inventor: Shengjun Ma, Beijing (CN)

(73) Assignee: BEIJING GOLDWIND SCIENCE & CREATION WINDPOWER EQUIPMENT CO., LTD., Beijing (CN)

(*) Notice: Subject to any disclaimer, the term of this patent is extended or adjusted under 35 U.S.C. 154(b) by 158 days.

(21) Appl. No.: 17/043,225

(22) PCT Filed: Sep. 3, 2019

(86) PCT No.: PCT/CN2019/104153
§ 371 (c)(1),
(2) Date: Sep. 29, 2020

(87) PCT Pub. No.: WO2020/052470
PCT Pub. Date: Mar. 19, 2020

(65) Prior Publication Data
US 2021/0021163 A1    Jan. 21, 2021

(30) Foreign Application Priority Data
Sep. 14, 2018   (CN) .................. 201811074884.X

(51) Int. Cl.
*H02K 1/20*    (2006.01)
*H02K 1/18*    (2006.01)
(Continued)

(52) U.S. Cl.
CPC .................. *H02K 1/20* (2013.01); *H02K 1/18* (2013.01); *H02K 9/10* (2013.01); *H02K 9/227* (2021.01)

(58) Field of Classification Search
CPC ........... H02K 1/20; H02K 1/18; H02K 1/187; H02K 9/10; H02K 9/22; H02K 9/225; H02K 2209/00
(Continued)

(56) References Cited

U.S. PATENT DOCUMENTS 6,498,408 B2    12/2002   Tong et al.
11,384,741 B2 *  7/2022   Ma .......................... H02K 1/20
(Continued)

FOREIGN PATENT DOCUMENTS

CN    203774905 U    8/2014
CN    104600886 A    5/2015
(Continued)

OTHER PUBLICATIONS

International Search Report and Written Opinion issued in corresponding PCT Application No. PCT/CN2019/104153, dated Dec. 9, 2019, 9 pages.
(Continued)

*Primary Examiner* — Michael Andrews
(74) *Attorney, Agent, or Firm* — Bayes PLLC

(57) ABSTRACT

A stator assembly, an electrical motor having the stator assembly, a wind power generator set and a method for cooling a stator assembly are provided. The stator assembly includes a stator support and a stator core mounted on the stator support, wherein the stator support includes a support enclosure plate, a first axial air flow channel is formed between the support enclosure plate of the stator support and a radial side surface of the stator core, and the first axial air flow channel is used for receiving a first cold air flow, so that
(Continued)

the cold air flow can flow in the axial direction. The stator assembly can introduce a cold air flow from the other side, opposite an air gap, of a stator during the operation of an electrical motor, so that two radial sides of the stator can be cooled at the same time.

5 Claims, 9 Drawing Sheets

(51) Int. Cl.
    *H02K 9/10* (2006.01)
    *H02K 9/22* (2006.01)
(58) Field of Classification Search
    USPC .............................................. 310/52, 58, 59
    See application file for complete search history.

(56) References Cited

U.S. PATENT DOCUMENTS

| | | | | |
|---|---|---|---|---|
| 2010/0237727 | A1* | 9/2010 | Mantere | H02K 9/10 310/64 |
| 2018/0019642 | A1* | 1/2018 | Wang | H02K 1/187 |
| 2018/0069442 | A1* | 3/2018 | Ma | F03D 9/25 |
| 2019/0334394 | A1* | 10/2019 | Messner | F03D 9/25 |

FOREIGN PATENT DOCUMENTS

| | | |
|---|---|---|
| CN | 104600907 A | 5/2015 |
| CN | 204361826 U | 5/2015 |
| CN | 204391983 U | 6/2015 |
| CN | 107623390 A | 1/2018 |
| DE | 19636591 A1 | 3/1998 |
| DE | 102016203945 A1 | 9/2017 |
| EP | 2234246 A1 | 9/2010 |
| EP | 2518868 A1 | 10/2012 |
| EP | 2958217 A1 | 12/2015 |
| EP | 3252930 A1 | 12/2017 |
| WO | 2018115357 A1 | 6/2018 |

OTHER PUBLICATIONS

First Chinese Office Action in corresponding Chinese Application No. 201811074884.X dated May 9, 2020 (8 pages).
European Search Report in corresponding European Application No. 19859345.1 dated Jul. 23, 2021 (11 pages).
First Examination Report in corresponding Indian Application No. 202017046073 dated Apr. 20, 2021 (6 pages).

* cited by examiner

US 11,552,511 B2

STATOR ASSEMBLY, ELECTRICAL MOTOR, WIND POWER GENERATOR SET AND METHOD FOR COOLING STATOR ASSEMBLY

CROSS-REFERENCE TO RELATED APPLICATIONS

The present application is a National Phase entry of International Application No. PCT/CN2019/104153, filed on Sep. 3, 2019, which claims the priority to Chinese Patent Application No. 201811074884.X, filed on Sep. 14, 2018. The entire contents of each of the above-identified applications are expressly incorporated herein by reference.

TECHNICAL FIELD

The present application relates to the technical field of electrical motors, and in particular to a stator assembly having a cooling structure and an electrical motor having the stator assembly.

BACKGROUND

A large amount of heat is generated during the operation of an electrical motor. The heat source comes from an inside of the electrical motor. Part of the heat source is a copper loss generated during the current flows through a stator winding, and part of which is an iron loss generated during the magnetic flux in the iron core changes. The loss is converted into heat, which increases the electrical motor temperature. The increase in the temperature of the electrical motor may directly affect the service life and rated capacity of the electrical motor, and may also cause the electrical motor to malfunction. One of the main risks of motor failure due to motor heating is that the thermal expansion of the stator core reduces the air gap between the stator and the rotor, and the permanent magnet poles provided on the rotor may collide with the stator core to cause damage, and in severe cases, it may cause the electrical motor failure or damage. Therefore, the cooling problem is of great significance for the electrical motor, especially for the wind electrical generator, and the maintenance cost and economic loss caused by the electrical motor failure are negative.

In the conventional technology, cooling medium is usually introduced into the air gap between the stator and the rotor to cool the heat source components of the electrical motor. For a large rotating electrical machine such as a wind electrical generator, forced convection of the heat exchange is usually performed on the heat source of the winding, and relying on high-power and large-scale (impeller diameter) fluid machinery (ventilators), for example, relying on fluid machinery, the cooling medium is forcibly introduced into the air gap between the stator and the rotor or the radial ventilation channel of the stator core winding. On one hand, this cooling method of introducing cold airflow into the air gap does not completely prevent the expansion and deformation of the stator; and on the other hand, serious impact of the fluid transmission of the cooling medium and the wind-induced noise of the air flow on the natural environment is also not allowed by the ecological regulations.

In addition, in the conventional technology, when the wind turbine is cooled, a partition wall heat exchanger is provided in the nacelle, and the heat generation surface in an inner circulation cavity is cooled by an external circulation of natural ambient airflow, and the induced draft fan introduces the fluid cooled by the heat exchanger and diffuses the fluid in a rear space of the cabin at 360 degrees. However, in this cooling method, the loss of the resistance along the path and local area during the fluid transmission process is large, which restricts the heat exchange rate of the internal heat generation link of the electrical motor, thus the key organization inside the electrical motor—the insulation structure still has a high risk of high temperature rise and threatening the stability of permanent magnetic pole performance.

SUMMARY

An object of the present application is to provide a stator assembly having a cooling structure and an electrical motor having the stator assembly.

According to an aspect of the present application, a stator assembly is provided. The stator assembly includes a stator bracket and a stator core, the stator bracket includes a support enclosure plate, the stator core is mounted on the support enclosure plate, and a first axial airflow channel is formed between the support enclosure plate and a radial side surface of the stator core, and the stator assembly further includes an airflow delivering unit for supplying a first cold airflow to the first axial airflow channel, to make the first cold airflow flow in the axial direction of the first axial airflow channel.

According to another aspect of the present application, an electrical motor is provided, which includes the stator assembly as described above.

According to yet another aspect of the present application, a wind turbine is provided, which includes the stator assembly as described above.

According to yet another aspect of the present application, a method for cooling the stator assembly of the electrical motor, including: the first axial airflow channel is used for receiving a cold airflow, so as to allow the cold airflow to flow in the first axial airflow channel in an axial direction.

According to the embodiments of the present application, a cold airflow may be introduced to another side of the stator opposite to the air gap during the operation of the electrical motor, so that both radial sides of the stator are cooled at the same time, reducing the expansion and deformation of the stator core and preventing the air gap from narrowing, and preventing the stator from baking the magnetic pole at high temperature, thereby protecting the magnetic pole and extending the service life of the electrical motor.

BRIEF DESCRIPTION OF THE DRAWINGS

The embodiments of the present application are described completely hereinafter in conjunction with the drawings, so that the above and other objects and features of the present application will become clearer.

REFERENCE NUMERALS

| | | | |
|---|---|---|---|
| 50 | cold air confluence box; | 60 | hot air confluence box; |
| 100 | stator core; | 110 | dovetail slot; |
| 120 | bridging portion; | 140 | tooth pressing plate; |
| 200 | stator bracket; | 210 | pillar; |
| 220 | support enclosure plate; | | |
| 300 | spoiler; | 310 | mesh; |
| 400 | vortex tube; | 410 | vortex chamber; |
| 420 | hot end tube section; | 430 | nozzle; |
| 440 | cold end tube section; | 450 | cold end orifice plate; |
| 460 | regulating valve; | 610 | filter; |
| 620 | compressor; | 630 | compressed air collecting box; |
| 640 | branch pipe; | 650 | hot air collecting box. |

DETAILED DESCRIPTION

Hereinafter, taking an inner stator of an electrical motor as an example, the embodiments of the present application will be described in detail in conjunction with the drawings.

Figure 1:
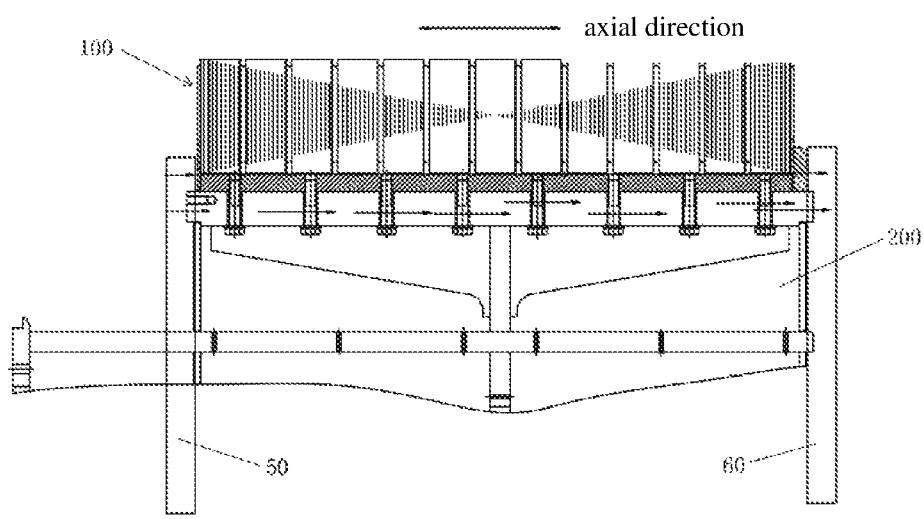
FIG. 1 is a schematic view showing the structure of a stator assembly according to an embodiment of the present application.
Figure 2:
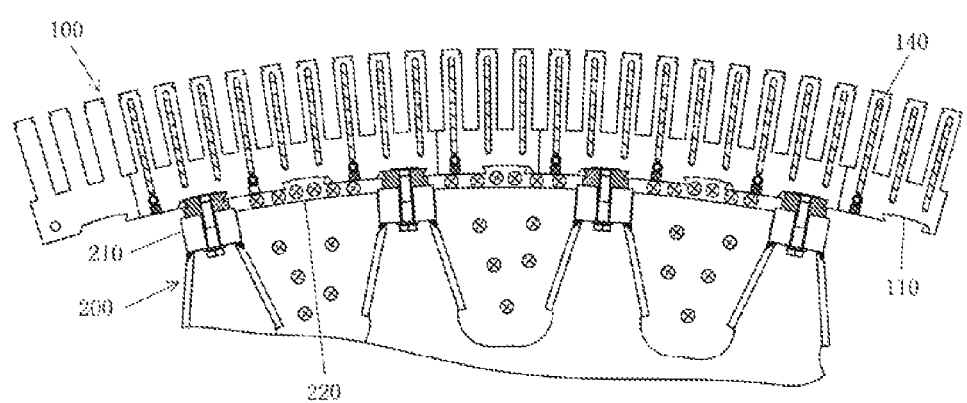
FIG. 2 shows the structure of the stator assembly according to the first embodiment of the present application.

As shown in FIGS. 1 and 2, in order to reduce eddy current loss and other losses, a stator core 100 of an electrical motor is formed by stacking ferromagnetic conductor sheets with large resistivity and small hysteresis loop area after the sheets are punched and treated with insulation. In the conventional technology, during the machining of the stator core, multiple fan-shaped silicon steel sheets are usually spliced in the circumferential direction and stacked in an axial direction. A pillar 210 of a stator bracket 200 is jointed with a dovetail slot 110 by a fastener, thereby the silicon steel sheets are fixed to a support enclosure plate 220 of the stator bracket in the circumferential direction, and both ends of each of the silicon steel sheets in the axial direction are respectively clamped by a tooth pressing plate 140 to form a stator assembly including the stator core 100 and the stator bracket 200.

The inventor of the present application has found through research that the method of passing a cold airflow into the air gap between the stator and the rotor of the electrical motor can effectively cool the magnetic poles and windings on both sides of the air gap, but for the stator core, the cold airflow directly contacts the radial side surface of the air gap, and the radial side surface far from the air gap is difficult to be cooled, thus the temperature distribution of the stator core in the radial direction is uneven, and there is a large difference in the heat distribution between a radially outer part and a radially inner part. The part of the stator core away from the air gap is susceptible to expansion and deformation, resulting in a narrow air gap between the stator and the rotor.

In order to solve the above problems, an innovative technical solution to the traditional cooling method and traditional cooling structure of the electromagnetic device (such as the electrical motor core heat source) is proposed in the embodiments of the present application, and the radial side surface of the stator core opposite to the air gap is cooled, so that the two radial sides of the stator core are cooled at the same time, reducing the difference in heat distribution on the radial sides of the stator core. In addition, the stator bracket is also cooled to reduce the difference between the cooling degree of the stator bracket and the core winding away from the air gap, and to reduce the difference in heat distribution between the core winding and the stator bracket, thereby the change of the air gap between the stator and the rotor due to the difference in thermal expansion of the core winding and the stator bracket is avoided.

Figure 3:
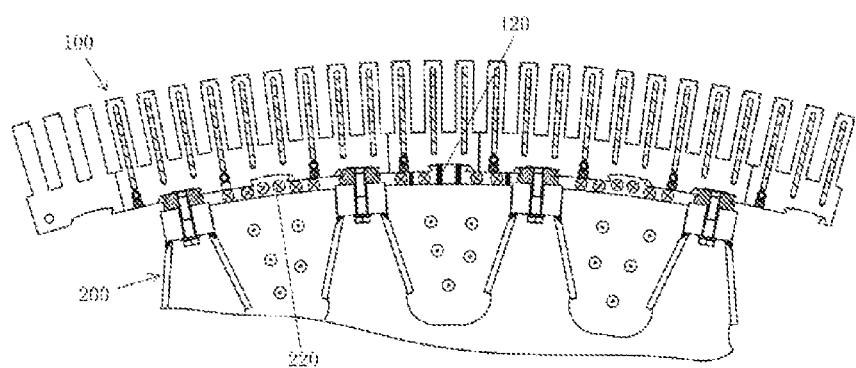
FIG. 3 shows the structure of the stator assembly according to the second embodiment of the present application.

For convenience of description, in the following embodiments and the drawings, the stator assembly according to the embodiment of the present application is shown by taking the inner stator of the electrical motor as an example. FIGS. 1, 2 and 3 are schematic views showing the structure of a stator assembly having a cooling structure according to an embodiment of the present application.

As shown in the figures, an annular gap is formed between the stator core 100 and the support enclosure plate 220. Since the low thermal conductivity of air may affect the heat exchange of the stator 100 to the stator bracket 200, the existence of such a gap may obstruct the stator 100 from absorbing heat from the stator core to a certain extent. According to the embodiment of the present application, in order to allow the electrical motor to be more effectively cooled, a cold airflow is introduced into the annular gap between the stator core 100 and the support enclosure plate 220, so that the radial side surface of the stator core 100 away from the air gap is directly in contact with the cooling source, and the stator core 100 can be simultaneously cooled from both sides, reducing the difference in the radial heat distribution of the stator core, and reducing the expansion degree and deformation risk of the stator core 100. At the same time, a cold airflow is also introduced into an axial ventilation channel of the stator bracket 200, so that the stator bracket 200 may also be served as a cooling source that absorbs the heat of the stator core 100. When the temperature of the radial side surface of the stator bracket 200 and the stator core 100 decreases, a contraction force and a tension force in the radial direction are formed, and this can more effectively prevent the stator core 100 from expanding outward in the radial direction.

Specifically, the stator assembly according to the embodiment of the present application includes an airflow delivering unit, which includes a cold airflow supply pipe provided at a first axial end of the stator assembly, for example, a cold airflow confluence box 50 provided at a first end of the stator assembly, which is configured to introduce a first cold airflow into the annular gap (hereinafter referred to as a first axial air channel) between the stator core 100 and the support enclosure plate 220, and the first cold airflow flows in the axial direction of the stator core 100 from the first end to a second end, thereby the stator core 100 and the support enclosure plate 220 are cooled at the same time.

Preferably, another cold airflow supply pipe may be provided, and a second cold airflow is introduced into the axial ventilation channel (hereinafter referred to as a second axial ventilation channel) of the stator bracket 200, which is configured to cool the support enclosure plate 220 of the stator bracket 200, the radial support rib plate and the stator shaft. The cold airflow may be collected at the first axial end of the stator core 100 through the cold airflow confluence box 50. The hot airflow confluence box 60 may be provided at the second axial end of the stator core 100 to collect the hot airflow. In the embodiment shown in FIG. 2, the first cold airflow and the second cold airflow flow in the same axial direction. In the embodiment shown in FIG. 3, the first cold airflow and the second cold airflow reversely flow in the axial direction. Compared with the situation where the first cold airflow and the second cold airflow are arranged to flow in the same direction, the cooling effect is better by arranging the first cold airflow and the second cold airflow to flow in the reverse directions.

As shown in FIG. 3, according to the electrical motor of the embodiment of the present application, multiple bridging portions 120 may also be provided between the stator core 100 and the support enclosure plate 220. The bridging portions 120 are formed as columns extending in the radial direction of the stator core 100. One end of each of the bridging portions 120 is connected to the stator core 100, and another end of the bridging portion 120 is connected to the support enclosure plate 220. More specifically, the bridging portion 120 connects a radially inner surface of the stator core 100 and an outer peripheral surface of the support enclosure 200 in the radial direction.

The bridging portion 120 may be made of a material with high thermal conductivity, so as to facilitate a rapid heat conduction from the stator core 100 to the support enclosure plate 220. Preferably, the bridging portion 120 is formed integrally with the stator core 100. More specifically, when the silicon steel sheet is punched to form the stator core 100, a protrusion of a certain length (for example, 10 mm to 20 mm) is retained on a radially inner side of a portion of the silicon steel sheet. When multiple silicon steel sheets are stacked together, the protrusions on the silicon steel sheets stacked adjacent to each other in the axial direction are also sequentially stacked to form a columnar structure, and after the silicon steel sheets are mounted on the stator bracket 200, another end of the protrusion is welded to the support enclosure plate 220, so that a bridging portion 120 for conducting heat is formed between the stator core 100 and the support enclosure plate 220. On the one hand, the bridging portion 120 enables the heat of the stator core 100 to be more quickly conducted to the support enclosure plate 220; on the other hand, in the case that multiple bridging portions 120 are provided, the connection structure between the stator core 100 and the support enclosure plate 220 is more stable, so that the stator core 100 and the stator bracket 200 are integrated, and the combination between the stator core 100 and the stator bracket 200 is stronger.

Figure 4:
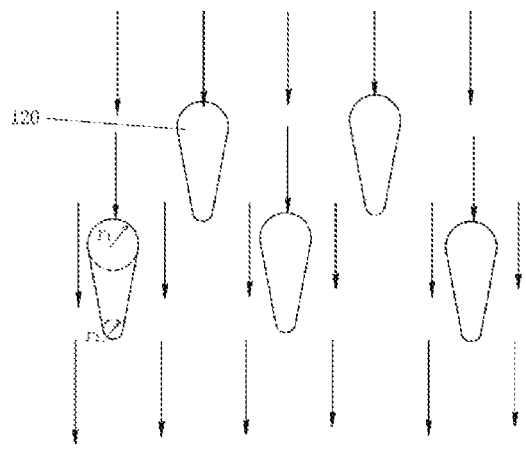
FIGS. 4 and 5 show the layout of a heat confluence bridge.
Figure 5:
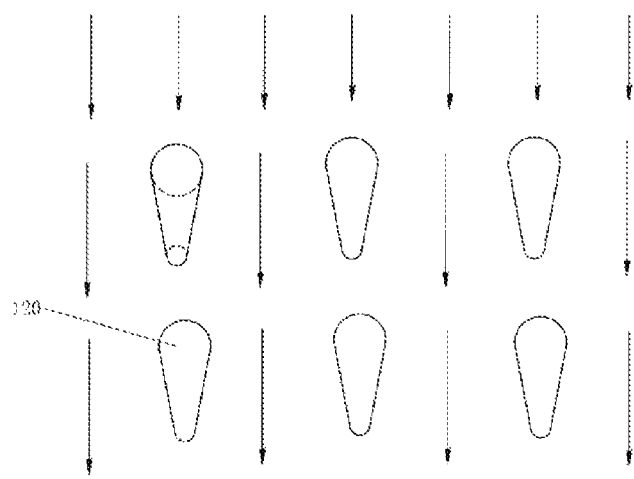

The multiple bridging portions 120 may be dispersedly formed on the radially inner peripheral surface of the stator core 100. FIGS. 4 and 5 respectively show the arrangement of the multiple bridging portions 120. In the embodiment shown in FIG. 4, the multiple bridging portions 120 are arranged in a cross in the flow direction of the airflow. In the embodiment shown in FIG. 5, the multiple bridging portions 120 are arranged in a row in the flow direction of the airflow. The multiple bridging portions 120 increase their own temperature when the heat of the stator core 100 is conducted to the support enclosure plate 220 of the stator bracket 200. When the first cold airflow passes through the first axial ventilation channel, the first cold airflow impacts the radially inner peripheral surface of the stator core 100 and the outer peripheral surface of the support enclosure plate 220 and sweeps across the bridging portions 120, so as to take away the heat from the stator core 100, the support enclosure plate 220, and the bridging portions 120 in a convective heat exchange manner.

The cross section of the bridging portion 120 may be various shapes, for example, a circular shape, an elliptical shape, a polygonal shape, and the like. In the embodiment shown in FIGS. 4 and 5, the cross-section of the bridging portion 120 is substantially in a shape of a droplet, including a first circular arc surface, a second circular arc surface, and a plane surface connecting the first circular arc surface and the second circular arc surface. The first circular arc surface forms a windward surface, the second circular arc surface forms a leeward surface, and the radius r1 of the first arc surface is greater than the radius r2 of the second arc surface. The plane parts on both sides may be tangent to both sides of the first arc surface and the second arc surface, respectively.

When the first cold airflow flows in the axial direction in the first axial airflow channel, the airflow impacts on the windward surface of the bridging portion 120, and after being split by the windward surface, the airflow flows forward from both sides along the circular arc surface of the windward surface, and may cause turbulence and shedding on both sides of the circular arc surface. However, since the plane portion is formed at the position where the airflow is about to be turbulent and shed, the airflow that has been shed adheres to the surface of the bridging portion 120 again, and continues to conduct convective heat exchange with the bridging portion 120 to take away the heat of the bridging portion 120. When the second circular arc surface of the leeward surface approaches, as the radius r2 of the second arc surface becomes smaller, the wake of the airflow becomes narrower and continues to flow forward after leaving the column. The bridging portion 120 with this cross-sectional shape has low airflow resistance and a thin airflow boundary layer, which is beneficial to the heat exchange between the gas and the solid surface.

Figure 6:
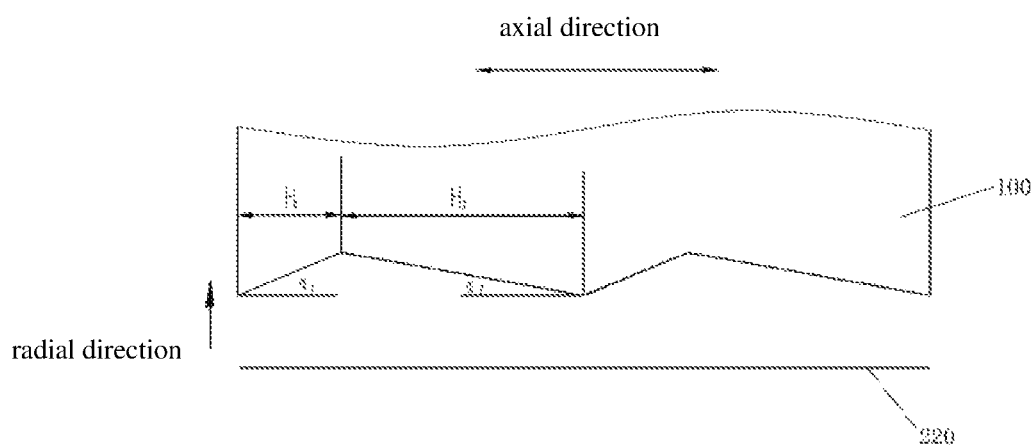
FIG. 6 shows a flow channel formed between a radially inner boundary of the stator core and a support enclosure plate.

FIG. 6 shows a schematic view of a part of the first axial airflow channel formed by the stator core 100 and the support enclosure plate 220 according to an embodiment of the present application. In the axial direction of the stator, the radially inner surface of the stator core 100 is uneven, so that the cross-sectional shape and the cross-sectional area of the flow channel vary in the flow direction of the airflow. When the airflow flows along the uneven side surface of the stator core 100, the boundary layer of the airflow is thinned after passing the uneven surface, the airflow in the front is disturbed and shed from the solid surface, and the colder airflow in the behind is continuously replenished, so that the front cold airflow is shed from the inner surface of the stator core 100 in time after absorbing heat from the stator core 100, making way for the cold airflow in the behind at a lower temperature, so that the stator core 100 is always in contact with the cold airflow at the lower temperature, thereby enhancing the heat exchange effect.

As shown in FIG. 6, the radial end surface of the stator core 100 may be formed into a wave having multiple bends in the axial direction. For example, in the axial direction of the stator, the inner surface of the stator core 100 is inclined outward in the radial direction to have an angle $\alpha 1$ to the axial direction; and after extending a predetermined length H1, the inner surface of the stator core 100 is changed to be inclined inward in the radial direction to have an angle $\alpha 2$ to the axial direction and extends a predetermined length H2. The above is repeated so that an uneven surface with the waves is formed in the axial direction. When the inner surface of the stator core 100 fluctuates in the axial direction, it is equivalent to the airflow channel, between the stator core 100 and the support enclosure plate 220, including multiple scaling channels, that is, gradually expanding channels and gradually contracting channels which are alternately arranged.

When the airflow sequentially flows through the gradually expanding channels and the gradually contracting channels arranged alternately, the airflow speed continuously changes. When the airflow enters the gradually expanding channel, the flow rate decreases, and when the airflow passes through the gradually contracting channel, the flow rate increases. In the continuously changing process of the flow velocity, the airflow boundary layer is disturbed to prevent the airflow from always adhering to the surface of the channel wall, so that the cold airflow is fully in contact with the surface of the stator core 100 and the support enclosure plate 220, thereby taking away more heat.

In order to make the inner surface of the stator core 100 fluctuate in the axial direction, when the silicon steel sheet is cut, a protrusion of a predetermined length/predetermined shape may be retained on the radially inner circumference of the silicon steel sheet, so that the radius of the silicon steel sheet at each radially inner circumference are exactly the same. In addition, multiple protrusions may be formed on the radially inner surface of the stator core 100 by cutting the radius of the stacked silicon steel sheets to different sizes, and by selecting the corresponding silicon steel sheets to be stacked, so that the stator core 100 is formed to have a radially inner surface that is uneven in the axial direction.

In order to further improve the effect of the stator core 100 conducting heat to the stator bracket 200, the blackness of the outer circumferential surface of the support enclosure plate 220 may be increased, thereby increasing the surface heat absorption rate of the support enclosure plate 220, and increasing the radiation heat exchange effect of the stator core 100 to the support enclosure plate 220. Ideally, the outer surface of the support enclosure plate 220 may be formed as a black body surface. As an example, the outer circumferential surface of the support enclosure plate 220 may be treated with chromium to form a chrome black surface on the support enclosure plate 220.

Figure 7:
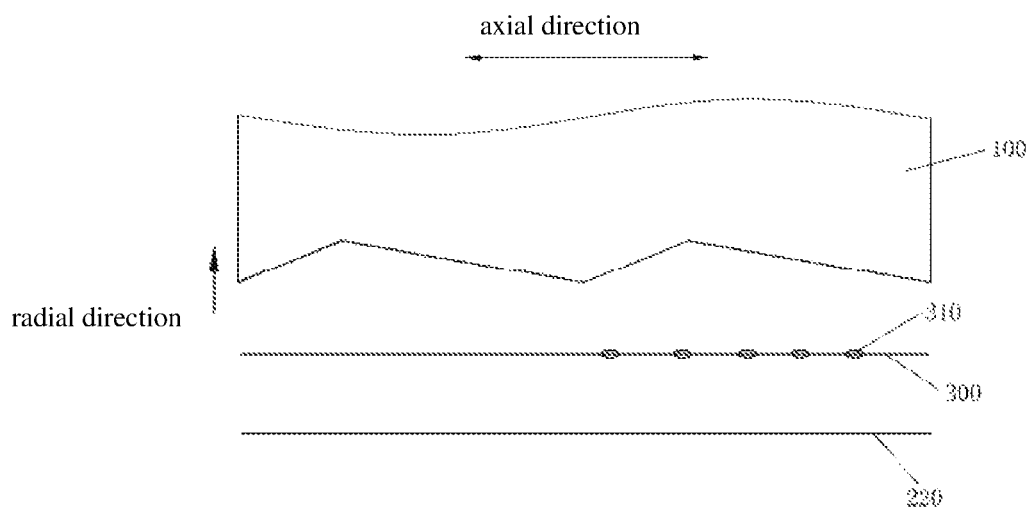
FIG. 7 shows that a spoiler is inserted in the flow channel formed between the radially inner boundary of the stator core and the support enclosure plate.

As shown in FIG. 7, a spoiler 300 may also be inserted between the stator core 100 and the support enclosure plate 220. The spoiler 300 may be of a circular arc shape and inserted into the airflow channel between the stator core 100 and the support enclosure plate 220, and both sides of the spoiler 300 in the radial direction maintain a predetermined distance from the stator core 100 and the support enclosure plate 220, respectively. The spoiler 300 may be a complete column, or multiple arc-shaped plates dispersedly arranged. By inserting the spoiler 300 into the gap between the stator core 100 and the support enclosure plate 220, the airflow is further disturbed, and the airflow is turbulent. The spoiler 300 may be formed to have a rough surface, and a high-roughness sintered plate may be used for making the spoiler 300.

The spoiler 300 may also be provided with meshes 310 so that the airflow on one side of the spoiler 300 may pass through the meshes 310 and enter the other side of the spoiler 300. For example, the high-speed airflow on the radially outer side of the spoiler 300 is jetted onto the support enclosure plate 220 after passing through the meshes 310, thereby impacting the support enclosure plate 220 at a higher speed, and enhancing the convective heat exchange effect. The spoiler 300 may be made of a metal plate with a surface treated into a rough surface to have a higher thermal conductivity.

By roughening the surface of the spoiler 300, the blackness and heat exchange area of the surface of the spoiler 300 may be improved, and the absorption efficiency of radiant heat may be improved. In addition, a chrome black surface may be formed on the surface of the spoiler 300 to improve the heat absorption capability of the spoiler 300. By inserting the spoiler 300, the heat exchange area in the airflow channel is increased to improve the convection heat exchange effect; by increasing the blackness of the spoiler 300, the radiation heat exchange effect is improved. In addition, by making the spoiler 300 have a rough surface and opening the spoiler 300 with the meshes 310, the boundary layer of the airflow may be thinned, and the airflow may be turbulent by the scaling channel. The heat exchange structure according to the embodiment of the present application can establish a channel for heat dissipation from the winding to the radially inner side of the stator core and the interior of the stator bracket, and can enhance the heat exchange effect from multiple angles and multiple dimensions.

Figure 8:
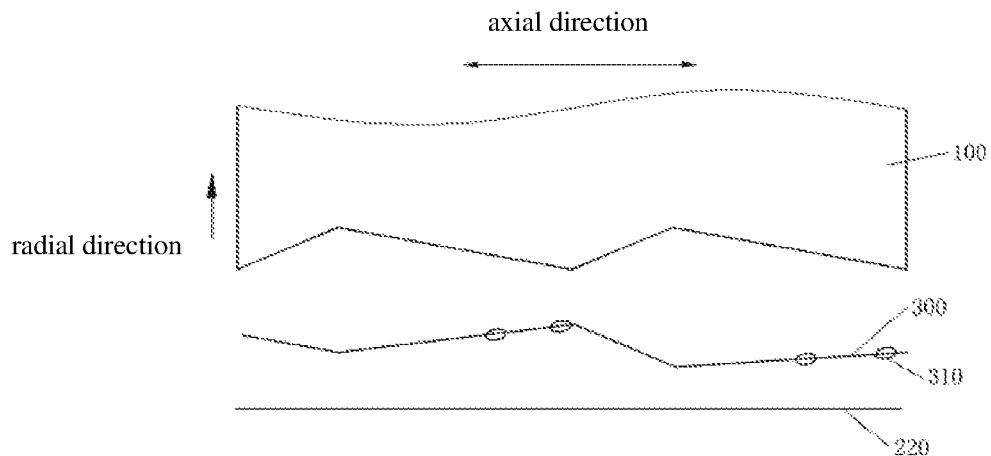
FIG. 8 shows another arrangement of the spoiler.

As shown in FIG. 8, the spoiler 300 may be bent multiple times in the axial direction of the stator. An airflow channel in which gradually contracting channels and gradually expanding channels are alternately arranged is formed between the stator core 100 and the spoiler 300. In the section corresponding to the gradually contracting channel, meshes 310 may be formed in the spoiler 300, so that after the airflow in the section of the gradually contracting channel passes through the spoiler 300, the airflow impacts the support enclosure plate 220 at a high speed.

In the embodiments of FIGS. 6, 7 and 8, the radially inner surface of the stator core 100 is bent and changed multiple times in the axial direction, however, the manner of forming the radially inner surface of the stator core 100 as an uneven surface is not limited to the embodiment shown in FIGS. 6 to 8, and may be formed in many ways.

Figure 9:
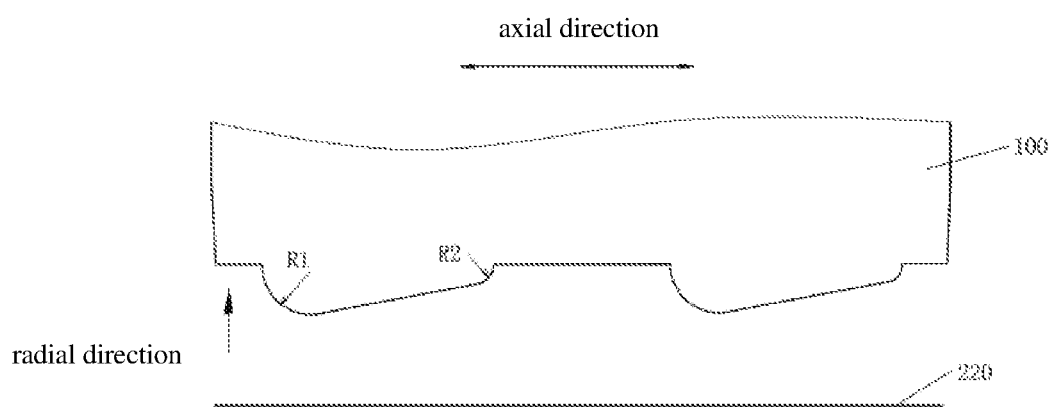
FIG. 9 shows the flow channel formed between the radially inner boundary of the stator core and the support enclosure plate.

FIG. 9 shows a cross-sectional view of a part of the stator core taken in the axial direction. As shown in FIG. 9, in the axial direction, multiple protrusion portions may be formed on the inner surface of the stator core 100, and each protrusion portions is of a semi-droplet shape. The so-called semi-droplet shape may be half of a droplet structure symmetrical in the long axis direction. The multiple protrusion portions with semi-droplet shape are alternately arranged in the direction of the airflow, and may be arranged in a cross or in a row.

As shown in the embodiment of FIG. 9, the windward surface and the leeward surface of each protrusion portion are both arc surfaces, the radius R1 of the arc surface of the windward surface may be greater than the radius R2 of the arc surface of the leeward surface, and a straight section is connected between the windward surface and the leeward surface to form a straight airflow path. The protrusion having a semi-droplet shape can reduce the fluid-solid resistance at the boundary layer and form an iron core boundary with a field-synergistic heat exchange enhancement effect.

Figure 10:
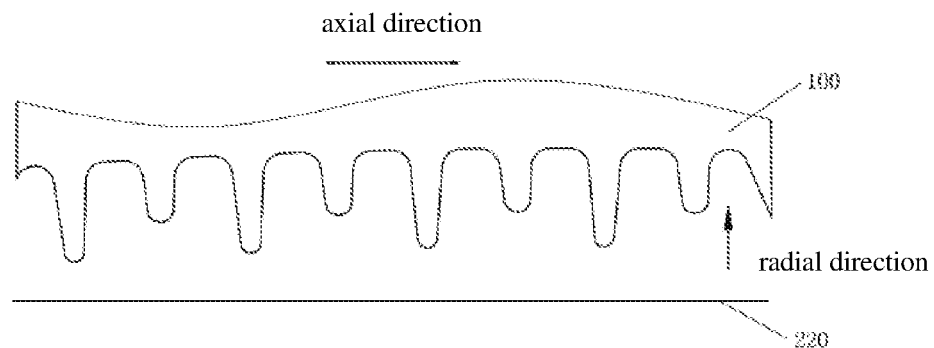
FIGS. 10, 11 and 12 respectively show other embodiments of flow channels formed between the radially inner boundary of the stator core and the support enclosure plate.
Figure 11:
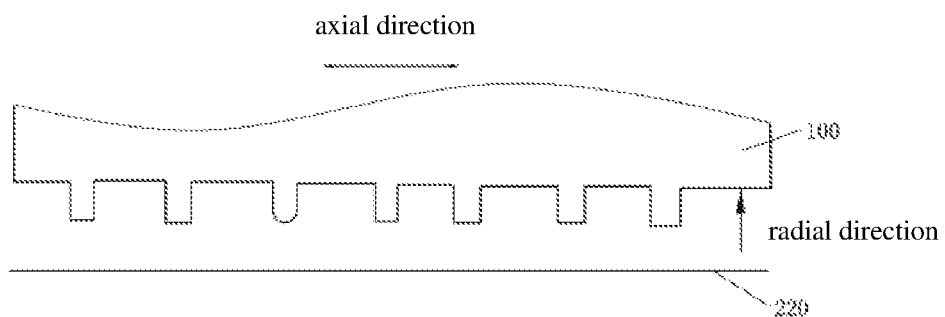
Figure 12:
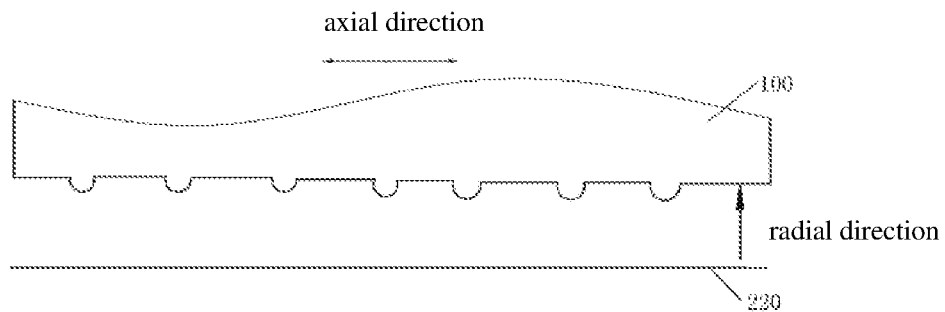

FIGS. 10, 11 and 12 show other embodiments of the shape of the stator core boundary. As shown in FIG. 10, multiple stalactite-shaped protrusions may be formed on the radial end surface of the stator core 100. As shown in FIG. 11, multiple square protrusions may be formed on the radial end surface of the stator core 100. As shown in FIG. 12, multiple arc-shaped protrusions may be formed on the radial end surface of the stator core 100. These stalactite-shaped protrusions, square protrusions, and arc-shaped protrusions may be alternately arranged on the radial end surface of the stator core 100, and it is not limited to adopting only a certain specific shape.

As described above with reference to FIG. 3 for the bridging portion, it is possible to form protrusions on the radially inner side of the silicon steel sheet when punching the fan-shaped silicon steel sheet. When multiple silicon steel sheets are stacked, these stalactite-shaped protrusions, square protrusions, arc-shaped protrusions, etc. can be formed.

The main purpose of forming protrusions on the inner surface of the stator core 100 is to destroy the boundary layer, thin the boundary layer, and avoid the attached boundary layer to isolate the inner surface of the stator core 100 from the main airflow in the airflow channel, thereby affecting the heat exchange effect. The height of the protrusion may be 1 m to 3 mm, and may be 20 mm to 30 mm in the length direction, for example, it may be formed by stacking 20 to 30 layers of silicon steel sheets. The interval between adjacent protrusions in the length direction may be about 50 mm.

According to the embodiment of the present application, by introducing the first cold airflow into the gap between the stator core 100 and the support enclosure plate 220, the stator core 100 may be cooled from the radially inner end surface to form a radially inward contraction force, preventing the stator core 100 from expanding and deforming from inside to outside. Further, by further introducing the second cold airflow in the axial ventilation channel of the stator bracket 200, the stator bracket 200 may be cooled, so that the stator bracket 200 can be used as a cold source for cooling the stator core 100. By providing the bridge connecting portion 120, the speed at which the stator core 100 conducts heat to the stator 200 can be increased, so that the heat of the stator core 100 is further conducted inward. In the embodiment of the present application, based on the conservation of energy, the intensity of radiant heat and the heat dissipation share that the radially outer surface of the air gap side of the motor heat source (winding and its magnetic conductive parts) structure crosses the air gap space to release radiant heat to the motor rotor poles are indirectly reduced to avoid high-temperature baking of the magnetic poles and inhibit temperature rise, thereby protecting the magnetic poles and the insulating medium.

In the above description, although the inner stator structure is taken as an example to describe the embodiment of the present application, the above cooling structure may also be applied to an outer stator structure. By introducing a cold airflow to a side of the stator core opposite to the air gap, both the ventral and back sides of the stator core are cooled, which can effectively prevent the expansion and deformation of the stator core and prevent the stator core from baking at high temperature, thereby protecting the magnetic pole and the insulating material in the electrical motor.

In order to continuously supply cold airflow into the electrical motor, a cold airflow supply structure is provided according to the present application. The cold airflow supply structure proposed in the embodiment of the present application includes a vortex tube, and cold air is generated through the vortex tube, so that the air is continuously supplied to the electrical motor.

Figure 13:
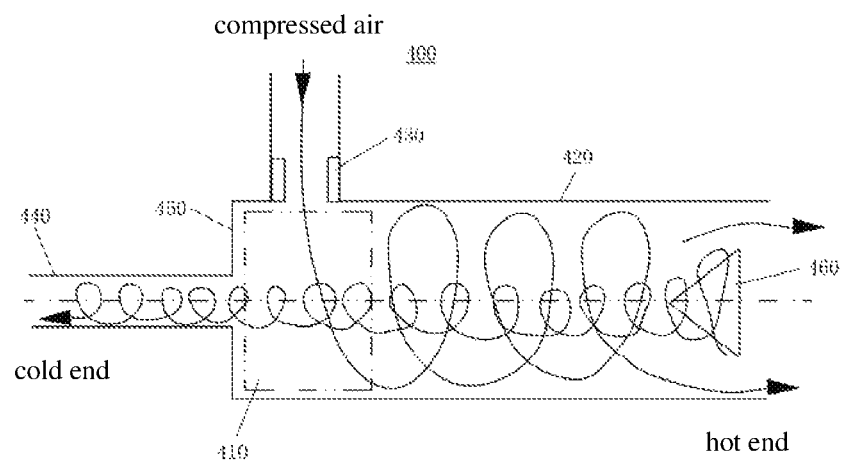
FIG. 13 shows a schematic diagram of the cooling principle of a vortex tube.
Figure 14:
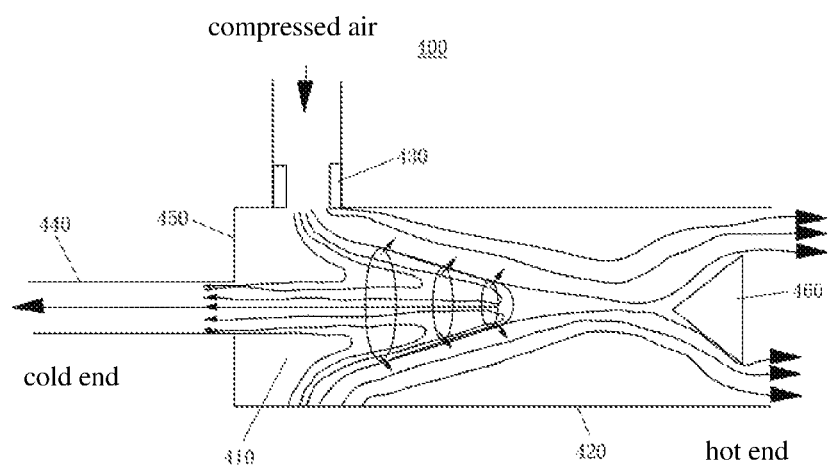
FIG. 14 shows a schematic view of the flow field distribution in the vortex tube.

FIG. 13 shows a schematic diagram of the cooling principle of the vortex tube, and FIG. 14 shows a schematic view of the flow field distribution in the vortex tube. As shown in FIGS. 13 and 14, a vortex tube 400 includes a tube body, and a first end of the tube body is a cold end and a second end is a hot end. According to functional division, the vortex tube 400 includes a vortex chamber 410 in the middle, a nozzle 430 tangentially connected to the vortex chamber 410, a hot end tube section 420 on one side of the vortex chamber 410, and a cold end tube section 440 on the other side of the vortex chamber 410. The flow channels of the nozzle 430 are arranged tangentially along the radial periphery of the vortex chamber 410. The diameters of the tubes of the vortex chamber 410 and the hot-end tube section 420 are the same, and the diameter of the cold end tube section 440 is smaller than the diameter of the hot end tube section 420, and the cold end tube section 440 is connected to the vortex chamber 410 by a cold hole plate 450 having through holes. A regulating valve 460 is provided at the outlet of the hot end tube section 420. The regulating valve 460 is a throttling member, which may be a cone-shaped blocking body, and the cone tip of the cone-shaped blocking body faces an inside of the tube body.

After the compressed air enters the internal flow channel of the nozzle 430 for expanding and accelerating, the compressed air enters the vortex chamber 410 at a high speed in the radial tangent direction of the straight tube section. A high-speed spiral vortex is formed in the vortex chamber 410, and the airflow may flow along the inner wall of the tube to the hot end tube section 420 of the vortex tube 400 at a speed of up to one million revolutions per minute. After a part of the airflow is blocked by the regulating valve 460, a return airflow is formed in an inner central area of the inner spiral vortex tube, rotates in the opposite direction in the inner circle of the original airflow and flows to the cold end tube section 440 of the vortex tube, and the remaining part of the air flows out through the hot end outlet. During this process, the two airflows exchange heat, the temperature of the inner ring airflow is greatly decreased (the temperature may reach −50 to −10 Celsius), a cold airflow is formed and flow out from the cold end outlet of the vortex tube 400, and the outer ring airflow becomes very hot and flows out from the hot end outlet of the vortex tube 400. The separation effect of the temperature of the same air flow may be generated by the vortex tube 400, and the cold and hot airflows with a wide temperature difference may be obtained.

Herein, the embodiments of the present application use the cold airflow for cooling the internal heat generating parts (windings and their magnetically conductive component structures) of the electrical motor. In addition, the hot airflow may also be used for drying at the junction of the root of the winding end and the iron core or for drying inside the air gap when the wind generator stops generating electricity.

Figure 15:
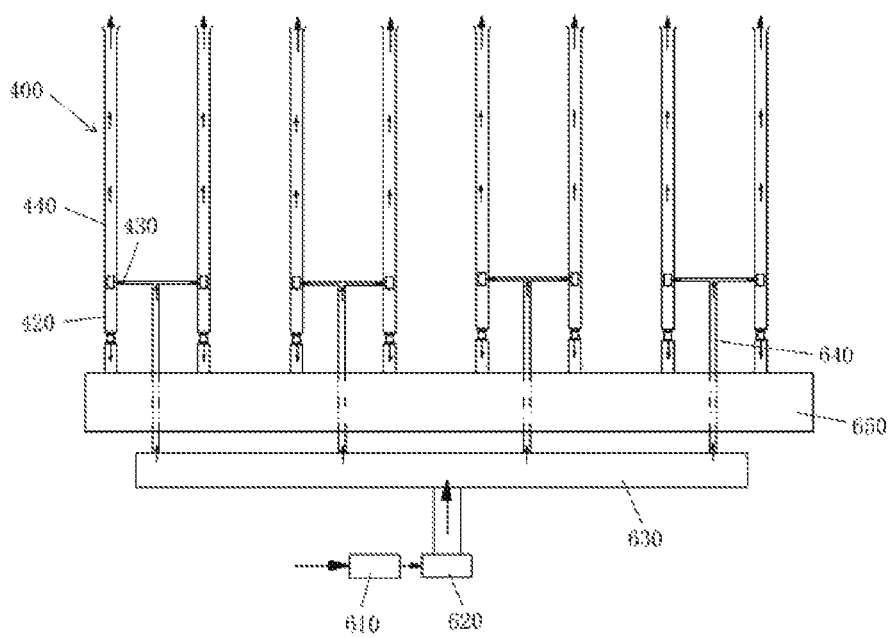
FIG. 15 shows a cold airflow supply device according to an embodiment of the present application.

FIG. 15 shows a cold airflow supply device according to an embodiment of the present application. As shown in FIG. 15, after the air is filtered by an air filter 610, the air is compressed into high-pressure air by the compressor 620, and then supplied to the compressed air collecting box 630. Compressed air is respectively supplied to the multiple vortex tubes 400 by the multiple branch pipes 640, and the cold and hot airflows are generated by the vortex tubes. The cold airflow may be supplied to the inside of the electrical motor to cool down the heat generating parts of the electrical motor. The hot airflow may be collected in the hot air collecting box 650 for drying at the junction of the root of the winding end and the iron core or for drying inside the air gap when the wind generator stops generating electricity.

As shown in FIG. 15, multiple vortex tubes 400 (for example, two vortex tubes 400) may share a cold airflow supply tube, that is, share a branch pipe 640.

The cold airflow supply device according to the present application may be provided in the nacelle or in the stator bracket. Compared with the structure provided with the partition wall heat exchanger in the conventional technology, the cold airflow supply device according to the present application has a simpler structure, and the flow resistance loss during the airflow transmission is small. The cold airflow may be directly supplied to the heat generating parts that need to be cooled, which improves the heat exchange rate of the internal heat generating parts. The source for generating compressed air may be ambient air, air in the nacelle, or gas from the heat exchanger of the wind turbine.

According to the embodiment of the present application, a method of simultaneously cooling both ends of the electromagnetic device with the columnar structure and the rotary structure in the radial direction is adopted. This method is consistent with the symmetrical heat exchange of heat transfer and may obtain the effect of high-rate heat exchange, and is more in consistent with the engineering thermal stress through the use of temperature symmetry (heated or cooling) of the structural parts to avoid asymmetric expansion and deformation of the structural parts. In addition, in the embodiments of the present application, a vortex tube is used to generate a cold airflow without increasing the power of the cooling medium fluid transmission power source, considering long-term operation and use, and subject to the requirements of device cost and environmental protection, to solve the internal contradictions in the cooling medium fluid transmission process channel.

According to the embodiments of the present application, by innovating the traditional way and traditional structure of cooling electromagnetic devices (such as motor core heat generating parts), the stator core and the stator bracket simultaneously play the role of strengthening the heat source for absorbing heat energy and especially the radial root (or back and its flow channel) of the electrical motor heat source (winding and its magnetically conductive parts) structure are cooled at the same time, which make the electrical motor heat source (winding and its magnetically conductive parts) be cooled and dissipate heat to obtain a new channel for radially enhanced heat dissipation. Based on the conservation of energy, the intensity of radiant heat and the size of the heat dissipation share that the radially outer surface of the air gap side of the motor heat source structure (winding and its magnetic conductive parts) across the air gap space to release radiant heat to the motor rotor poles are indirectly reduced, to protect the electrical motor insulation, to protect the permanent magnet poles of the electrical motor and suppress its temperature rise.

According to an embodiment of the present application, by forming the axial airflow channel into a channel that gradually contracting channels and gradually expanding channels alternatively arranged, providing a spoiler in the axial airflow channel, forming meshes on the spoiler, and forming chrome black surface on the spoiler, and with the help of the field synergy principle of convection heat exchange (including jet impact heat exchange technology), the enhanced heat transfer technology of radiant heat exchange (surface coating), and "tangential input internal spiral vortex tube" from the perspective of engineering thermodynamics (vortex tube), the surface structure of the radial end of the electrical motor iron core and the structure of heat exchange of the cold fluid are innovated.

The cold airflow is generated by the vortex tube, which provides the channels for the generation, transmission and heat exchange of the cooling medium of the electromagnetic device, and becomes the cooling source of the electrical motor iron core heat source and the winding heat source in the iron core slot, thereby protecting the electrical motor insulation and protecting the permanent magnet poles to suppresses temperature rise, which is used to innovate the traditional way of stator core cooling. The vortex tube generates the cold and hot airflows, thereby generating a cold airflow with a cooling effect and a hot airflow with a drying function for the magnetic poles of the permanent magnet wind generator and the armature insulation system, and achieving multi-dimensional heat dissipation channels for the heat source in the electrical motor.

Although the present application has been described with reference to the embodiments, it will be apparent to those skilled in the art that various changes and modifications can be made without departing from the spirit and scope of the present application. Therefore, it should be understood that the above-described embodiments are not limiting, but illustrative. Therefore, the scope of the present application will be determined by the broadest permissible interpretation of the claims and their equivalents, and should not be restricted or limited by the foregoing description.

The invention claimed is:

1. A stator assembly, comprising:
a stator bracket, and
a stator core,
wherein the stator bracket comprises a support enclosure plate, the stator core is mounted on the support enclosure plate, a first axial airflow channel is formed between the support enclosure plate and a radial side surface of the stator core,
wherein the stator assembly further comprises an airflow delivering unit for supplying a first cold airflow to the first axial airflow channel, which makes the first cold airflow flow in an axial direction of the first axial airflow channel, and
wherein the stator core further comprises the airflow delivering unit, and the airflow delivering unit further comprises a vortex tube mounted on the stator support, the vortex tube comprises a vortex chamber, a nozzle in communication with the vortex chamber tangentially in a radial direction of the vortex chamber, a hot end tube section connected to one axial side of the vortex chamber, a cold end tube section connected to the other axial side of the vortex chamber, and a regulating valve provided in the hot end tube section, and the cold end tube section is in communication with the first axial airflow channel.

2. An electrical motor, comprising:
a rotor, and
a stator assembly, comprising:
a stator bracket, and
a stator core,
wherein the stator bracket comprises a support enclosure plate, the stator core is mounted on the support enclosure plate, a first axial airflow channel is formed between the support enclosure plate and a radial side surface of the stator core,
wherein the stator assembly further comprises an airflow delivering unit for supplying a first cold airflow to the first axial airflow channel, which makes the first cold airflow flow in an axial direction of the first axial airflow channel, and
wherein the stator core further comprises the airflow delivering unit, and the airflow delivering unit further comprises a vortex tube mounted on the stator support the vortex tube comprises a vortex chamber, a nozzle in communication with the vortex chamber tangentially in a radial direction of the vortex chamber, a hot end tube section connected to one axial side of the vortex chamber, a cold end tube section connected to the other axial side of the vortex chamber, and a regulating valve provided in the hot end tube section, and the cold end tube section is in communication with the first axial airflow channel.

3. A wind turbine, comprising:
a nacelle, comprising:
 an electrical motor, comprising:
  a rotor, and
  a stator assembly, comprising:
   a stator bracket, and
   a stator core,
   wherein the stator bracket comprises a support enclosure plate, the stator core is mounted on the support enclosure plate, a first axial airflow channel is formed between the support enclosure plate and a radial side surface of the stator core,
   wherein the stator assembly further comprises an airflow delivering unit for supplying a first cold airflow to the first axial airflow channel, which makes the first cold airflow flow in an axial direction of the first axial airflow channel, and
   wherein the stator core further comprises the airflow delivering unit, and the airflow delivering unit further comprises a vortex tube mounted on the stator support, the vortex tube comprises a vortex chamber, a nozzle in communication with the vortex chamber tangentially in a radial direction of the vortex chamber, a hot end tube section connected to one axial side of the vortex chamber, a cold end tube section connected to the other axial side of the vortex chamber, and a regulating valve provided in the hot end tube section, and the cold end tube section is in communication with the first axial airflow channel.

4. The wind turbine according to claim 3, wherein the airflow delivering unit comprises a cold airflow supply device, the cold airflow supply device comprises a vortex tube, and the vortex tube comprises a vortex chamber, a nozzle in communication with the vortex chamber tangentially in a radial direction of the vortex chamber, a hot end tube section connected to an axial side of the vortex chamber, a cold end tube section connected to another axial side of the vortex chamber, and a regulating valve provided in the hot end tube section, and the cold end tube section is in communication with the first axial airflow channel.

5. The wind turbine according to claim 4, wherein a plurality of vortex tubes are provided, and the cold airflow supply device further comprises:
 a compressor for generating compressed air;
 a compressed air collecting box for receiving the compressed air from the compressor; and
 a plurality of branch pipes having one end in communication with the compressed air collecting box and the other end in communication with at least one nozzle of the vortex tube to supply compressed air to a plurality of vortex tubes, wherein the vortex tube is arranged on the stator bracket, in the nacelle, or in the hub.

* * * * *